United States Patent [19]
Gaspard

[11] Patent Number: 5,743,548
[45] Date of Patent: Apr. 28, 1998

[54] TRAILER BALL GUARD

[76] Inventor: Terrance Gaspard, 1343 Holiday Pl., New Orleans, La. 70114

[21] Appl. No.: 517,921

[22] Filed: Aug. 22, 1995

[51] Int. Cl.⁶ .................................................. F16B 41/00
[52] U.S. Cl. ................. 280/507; 280/511; 70/229; 70/232
[58] Field of Search ..................... 280/507, 511; 70/229, 230, 231, 232, DIG. 57, DIG. 58

[56] References Cited

U.S. PATENT DOCUMENTS

| | | | |
|---|---|---|---|
| 3,496,742 | 2/1970 | Rothweiler et al. | 70/232 |
| 3,789,635 | 2/1974 | Van Brunt et al. | 70/232 |
| 4,794,769 | 1/1989 | Persons | 70/DIG. 57 |
| 5,087,064 | 2/1992 | Guhlin | 280/507 |
| 5,280,941 | 1/1994 | Guhlin | 280/507 |
| 5,332,251 | 7/1994 | Farquhar | 280/507 |
| 5,410,893 | 5/1995 | Easterwood | 70/14 |

FOREIGN PATENT DOCUMENTS 267892   9/1929   Italy ........................................ 70/232

*Primary Examiner*—Victor E. Johnson
*Attorney, Agent, or Firm*—Joseph N. Breaux

[57] ABSTRACT

A trailer ball guard that is lockably connectable about a ball shaft and a mounting nut of a trailer ball and hitch assembly for deterring removal of the ball from the tow bar and theft of the trailer ball assembly and a connected towed vehicle. The trailer ball guard includes a sleeve assembly that is connectable between a tow bar and a mounting nut, a cap that is connectable to the sleeve assembly in a manner to entrap the ball shaft and mounting nut therein, and a locking mechanism securable in connection between the sleeve assembly and the cap.

3 Claims, 2 Drawing Sheets

5,743,548

TRAILER BALL GUARD

TECHNICAL FIELD

The present invention relates to devices for preventing the removal of a ball from a trailer hitch assembly and more particularly to devices for preventing the removal of a ball from a trailer hitch assembly that has a trailer ball guard that lockably entraps the mounting nut and ball shaft thereby deterring theft of the ball and any towed vehicle which may be attached thereto.

BACKGROUND ART

Trailers and the vehicles or equipment towed thereon are expensive and often the target of thieves. Trailers are often stolen by simply unlatching the trailer tongue from the trailer ball. There are devices which lock the trailer tongue to the trailer ball. However, these devices do not prevent the removal of the mounting nut, thus, allowing the trailer ball and the trailer to be attached to another vehicle.

Trailer ball assemblies have been developed which have a shaft disposed through the longitudinal axis of the ball for connecting with a mounting assembly below the tow bar. When a trailer tongue is connected to the trailer ball the mechanism for detaching the ball from the tow bar is covered by the trailer tongue. These devices are expensive and require the purchase of various sized balls for all applications.

It would be a benefit, therefore, to have a trailer ball guard that lockably entraps a ball shaft and mounting nut thereby deterring theft of the trailer ball and an attached trailer. It would be a further benefit, to have a device that is attachable to various trailer hitch assemblies. It would still be a further benefit, to have a device that is inexpensive and securable to a trailer hitch assembly by the trailer ball mounting nut.

GENERAL SUMMARY DISCUSSION OF INVENTION

It is thus an object of the invention to provide a trailer ball guard that lockably entraps the trailer ball shaft and mounting nut therein, preventing removal of the trailer ball from the tow bar and deterring theft of an attached trailer.

It is a further object of the invention to provide a trailer ball guard that has a sleeve assembly that is connectable between the tow bar and ball mounting nut threaded onto the ball shaft.

It is a still further object of the invention to provide a trailer ball guard that has a sleeve member defining a bore adapted for disposing the ball shaft and mounting nut therein.

It is a still further object of the invention to provide a trailer ball guard that has a cap connectable to the sleeve member entrapping the ball shaft and mounting nut therein.

It is a still further object of the invention to provide a trailer ball guard that has a locking mechanism in connection between the sleeve assembly and the cap.

Accordingly, a trailer ball guard of the type lockably connectable about a ball shaft and a mounting nut of a trailer ball and hitch assembly for deterring removal of the ball from the tow bar and theft of the trailer ball assembly and a connected towed vehicle is provided. The trailer ball guard comprises: a sleeve assembly connectable between a tow bar and a mounting nut, a cap connectable to the sleeve assembly entrapping the ball shaft and mounting nut therein, and a locking mechanism in connection between the sleeve assembly and the cap.

The sleeve assembly includes a planar member having a top and bottom surface, and a sleeve member defining a bore extending from the bottom surface. The planar member forms a hole therethrough for passing the ball shaft into the bore defined by the sleeve member.

The cap is an elongated member defining a cavity therein. The cap is connected to the sleeve member in a manner entrapping the mounting nut and ball shaft within the sleeve bore and cap cavity. The cap may be disposable within the bore of the sleeve member. The cap may be sized to dispose the sleeve member within the cap cavity.

The cap may have pegs extending from an outer surface adapted for interlocking in L-shaped slots formed by the inner surface of the sleeve member connecting the cap and sleeve member. The cap may have internal threading connectable with external threading on the sleeve member. The cap may have external threading connectable with an internally threaded sleeve member.

The locking mechanism includes a hasp and a hasp bolt. The hasp forms a bolt aperture therethrough for disposing the hasp bolt. The hasp bolt forms an eyelet therethrough for disposing the bolt of a padlock preventing the removal of the hasp from the hasp bolt. The hasp has a first end which may be pivotally connected to an outer surface of the cap, the hasp bolt being connected to an exterior surface of the sleeve assembly. The first end of the hasp may be pivotally connected to an exterior surface of the sleeve assembly, the hasp bolt being connected to an outer surface of the cap.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
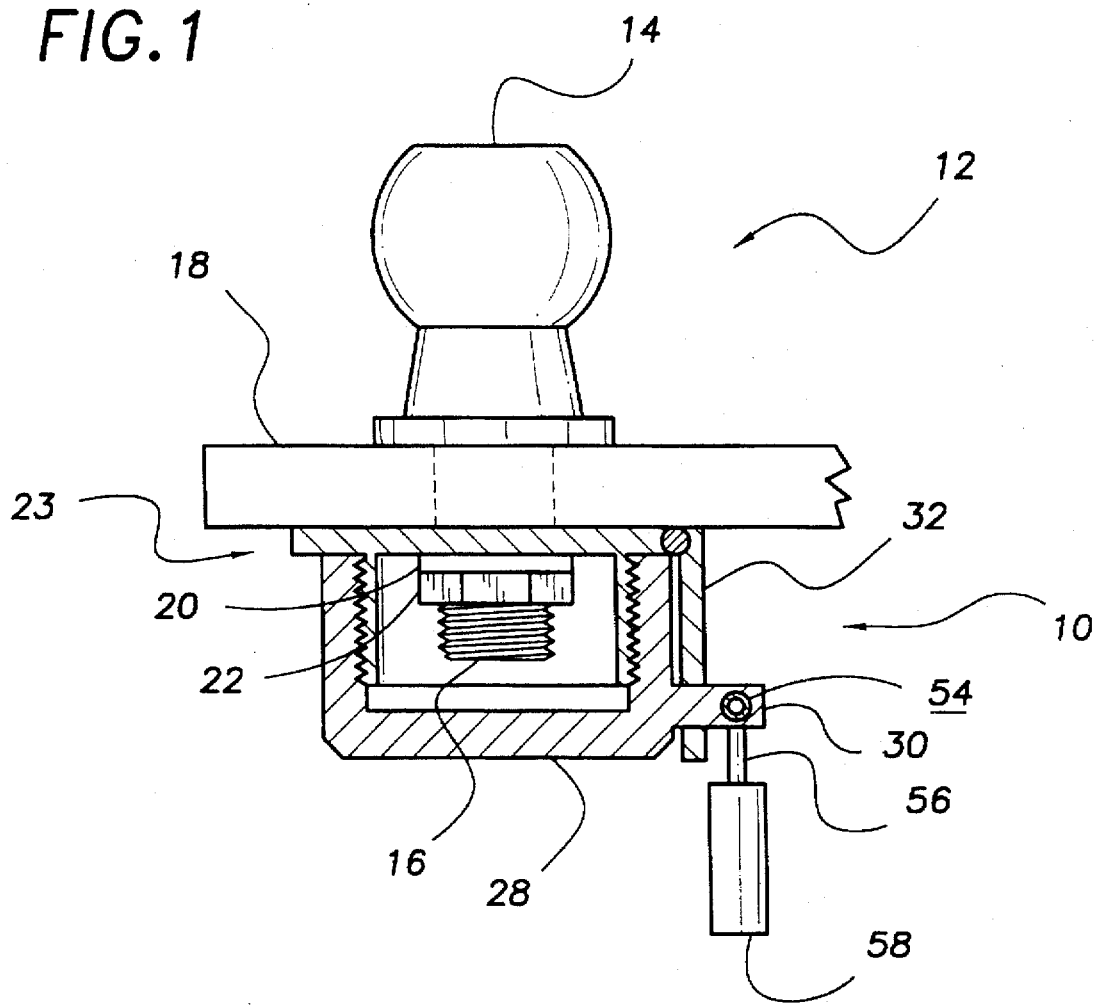
FIG. 1 is a sectional, side view of an exemplary embodiment of the trailer ball guard of the present invention.

FIG. 1 is a sectional, side view of an exemplary embodiment of the trailer ball guard of the present invention generally designated by the numeral 10. Trailer ball guard 10 is mounted beneath a trailer hitch assembly generally designated by the numeral 12. Trailer hitch assembly 12 includes a ball 14 having an externally threaded shaft 16 extending therefrom, a tow bar 18 connected to a towing vehicle (not shown), a mounting washer 20 and a mounting nut 22. Trailer ball guard 10 includes a sleeve assembly generally designated 23, a cap 28, and a locking mechanism having a hasp bolt 30 and a hasp 32.

Figure 2:
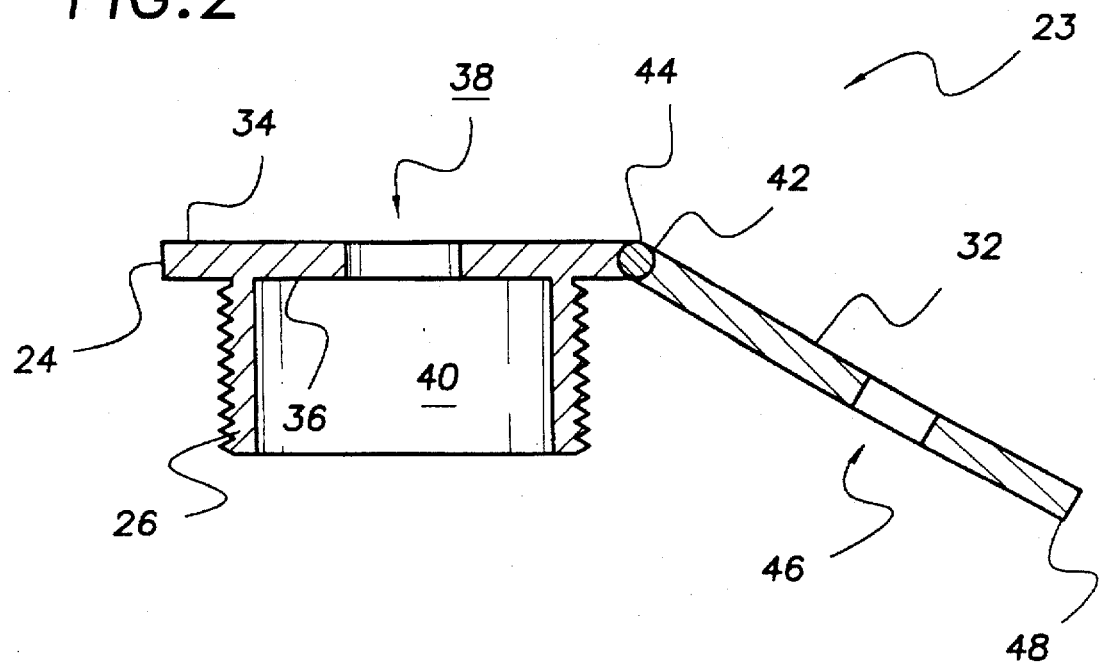
FIG. 2 is an isometric view of the sleeve assembly of the embodiment shown in FIG. 1 in isolation.

FIG. 2 is an isometric view of sleeve assembly 23 of the embodiment shown in FIG. 1 in isolation. Sleeve assembly 23 includes a planar member 24, a sleeve member 26.

Planar member 24 is a circular metal piece having a top and bottom surface 34,36. Planar member 24 is one-eighth inch thick and has a two inch outside diameter. Planar member 24 forms a three-quarter inch diameter centered hole 38 therethrough.

Sleeve member 26 is formed of unitary construction with planar member 24 and extends perpendicularly three-quarters of an inch from bottom surface 36. Sleeve member 26 is externally threaded and defines a bore 40 therein having an inside diameter of one and one-half inches.

Hasp 32 is a rectangular metal piece, one-eighth inch thick, three-quarters inch wide and two inches long. A first end 42 of hasp 32 is pivotedly connected to planar member 24 by a pivot pin 44. Hasp 32 defines a rectangular bolt aperture 46, one-half inch long by three-sixteenths inch wide, therethrough. Bolt aperture 46 is centered between first end 42 and second end 48.

Figure 3:
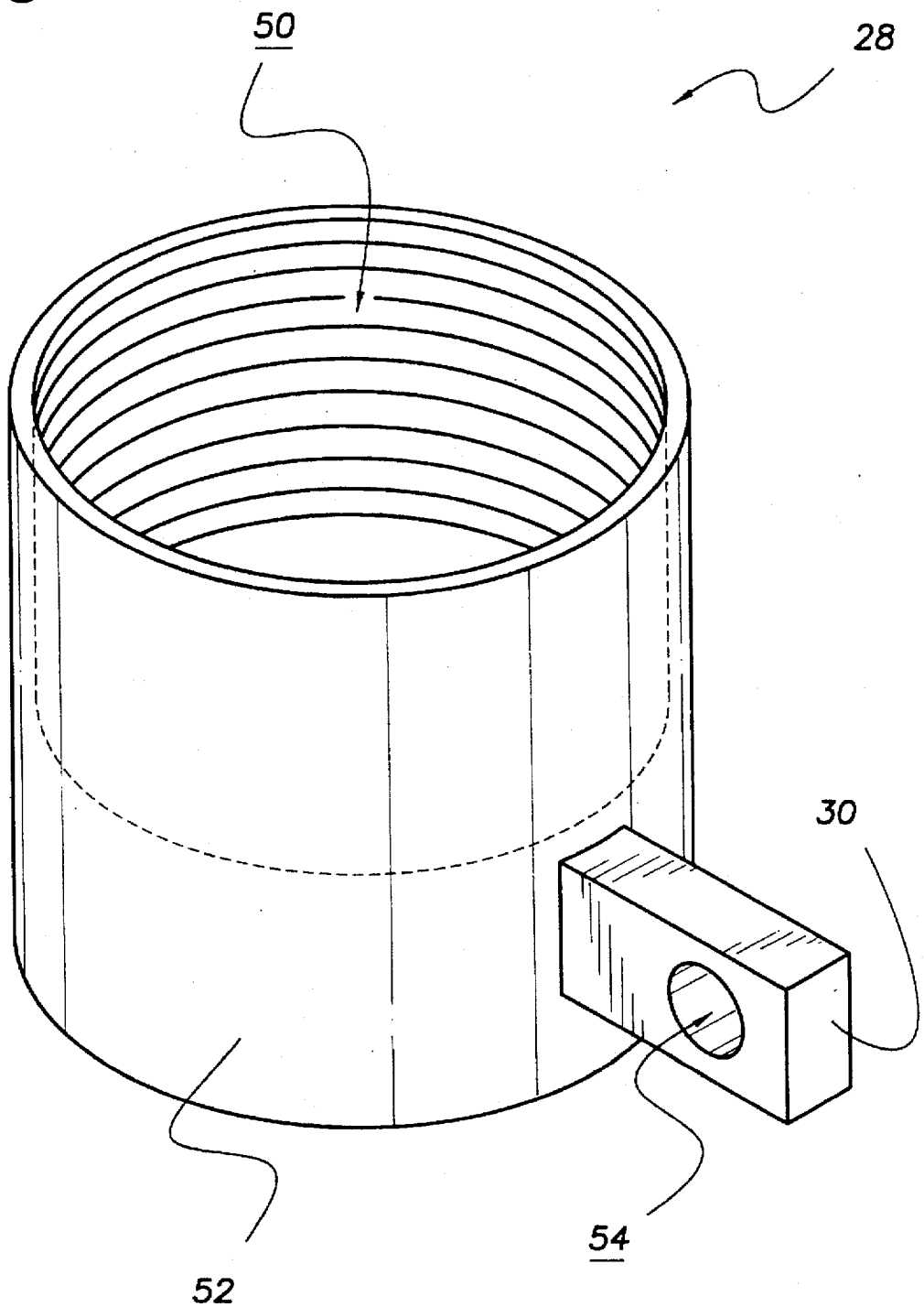
FIG. 3 is an isometric view of the cap of the embodiment shown in FIG. 1 in isolation.

FIG. 3 is an isometric view of cap 28 of the embodiment shown in FIG. 1 in isolation. Cap 28 is a two inch long circular, metal piece having an outside diameter of two inches. Cap 28 defines a cavity 50 extending three-quarters of an inch therein. Cavity 50 has a one and five-eighths inch inside diameter threaded for connecting with sleeve member 26 as shown in FIGS. 1 and 2.

Hasp bolt 30 extends ten-sixteenths of an inch perpendicularly from outer surface 52 of cap 28. Hasp bolt 30 is a three-sixteenth inch by one-half inch metal piece. Hasp bolt 30 defines a centered, one-quarter inch eyelet 54 horizontally therethrough.

Use of the trailer ball guard is now described with reference to FIGS. 1–3. A threaded shaft 16 extending from a conventional trailer hitch ball 14 is disposed through a tow bar 18 connected to a towing vehicle (not shown). Ball 14 is adapted for connecting with a socket of a trailer. Shaft 16 is disposed through hole 38 of planar member 24 into bore 40 of sleeve member 26, the top surface 34 of planar member 24 facing tow bar 18. Washer 20 and nut 22 are then threaded on shaft 16 and tightened down securely mounting ball 14 atop tow bar 18 and securing planar member 24 against tow bar 18.

Cap 28 is then threaded on to sleeve member 26 entrapping sleeve 26 and nut 44 within cavity 50 of cap 28. Cavity 50 is threaded so that when cap 28 is secured against bottom surface 36 of planar member 24 hasp bolt 30 is vertically aligned with hasp 32. Hasp 32 is then pivoted down disposing hasp bolt 30 through bolt aperture 46. A lock bolt 56 is then disposed through eyelet 54 and locked into a padlock 58, thus, lockably entrapping nut 44 and shaft 16 within trailer ball guard 10.

It can be seen from the preceding description that a device for preventing the removal of a ball from a ball and trailer hitch assembly which lockably entraps the trailer ball shaft and mounting nut therein, has a sleeve assembly that is connectable between the tow bar and ball mounting nut threaded onto the ball shaft, has a sleeve member defining a bore adapted for disposing the ball shaft and mounting nut therein, has a cap connectable to the sleeve member entrapping the ball shaft and mounting nut therein, and that has a locking mechanism in connection between the sleeve assembly and the cap has been provided.

It is noted that the embodiment of the trailer ball guard described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A trailer ball guard for use with a trailer hitch having a tow bar connected to a towing vehicle and a ball having a threaded ball shaft mounted atop the tow bar by a mounting washer and a mounting nut threaded onto the ball shaft, said trailer ball guard comprising:

a sleeve assembly adapted to be connectable between said tow bar and said mounting nut threaded onto said ball shaft;

a cap connectable to said sleeve assembly; and a locking mechanism in connection between said sleeve assembly and said cap adapted for lockably entrapping said ball shaft and said mounting nut therebetween;

said locking mechanism including a hasp bolt extending from said cap, said hasp bolt defining an eyelet therethrough; and a hasp having a first end pivotedly connected to said sleeve assembly, said hasp forming a bolt aperture for disposing said hasp bolt;

said hasp bold being disposable through said bolt aperture and adapted to receive a bolt of a padlock through said eyelet in a manner to lock said cap to said sleeve assembly.

2. A trailer ball guard for use with a trailer hitch having a tow bar connected to a towing vehicle and a ball having a threaded ball shaft mounted atop the tow bar by a mounting washer and a mounting nut threaded onto the ball shaft, said trailer ball guard comprising:

a sleeve assembly having a planar member and a sleeve member;

said planar member having a top and bottom surface defining a hole therethrough for passing said ball shaft, said planar member adapted to be connectable between said tow bar and said mounting nut threaded onto said ball shaft, said top surface being adapted to be positionable adjacent to said tow bar;

said sleeve member defining a bore adapted for disposing said ball shaft and said mounting nut, said sleeve member extending perpendicularly from said bottom surface of said planar member;

a cap defining a cavity connectable to said sleeve member adapted for entrapping said bolt shaft and said mounting nut within said bore of said sleeve member; and a locking mechanism in connection between said sleeve assembly and said cap adapted for lockably entrapping said ball shaft and said mounting nut within said bore of said sleeve member;

said locking mechanism including:

a hasp bolt extending from said cap, said hasp bolt defining an eyelet therethrough, and a hasp having a first end pivotedly connected to said sleeve assembly, said hasp forming a bolt aperture for disposing said hasp bolt;

said hasp bold being disposable through said bolt aperture and adapted to receive a bolt of a padlock through said eyelet in a manner to lock said cap to said sleeve assembly.

3. A trailer ball guard for use with a trailer hitch having a tow bar connected to a towing vehicle and a ball having a threaded ball shaft mounted atop the tow bar by a mounting washer and a mounting nut threaded onto the ball shaft, said trailer ball guard comprising:

a sleeve assembly having a planar member and a sleeve member;

said planar member having a top and bottom surface defining a hole therethrough adapted for passing said ball shaft, said planar member adapted to be connectable between said tow bar and said mounting nut threaded onto said ball shaft, said top surface adapted for being positionable adjacent to said tow bar;

said sleeve member defining a bore for disposing said ball shaft and said mounting nut, said sleeve member extending perpendicularly from said bottom surface of said planar member;

said sleeve member being externally threaded;

a cap defining a cavity, said cavity being companionately threaded for connection to said sleeve member adapted for entrapping said bolt shaft and said mounting nut within said bore of said sleeve member;

a hasp bolt extending from said cap, said hasp bolt defining an eyelet therethrough; and a hasp having a first end pivotedly connected to said planar member, said hasp forming a bolt aperture for disposing said hasp bolt;

said hasp bolt being disposable through said bolt aperture and adapted to receive a bolt of a padlock through said eyelet in a manner to lock said cap to said sleeve assembly.

* * * * *